Aug. 11, 1925.
A. A. BEIDELMAN
ELECTRIC LIGHT FIXTURE
Filed Aug. 27, 1923
1,549,432
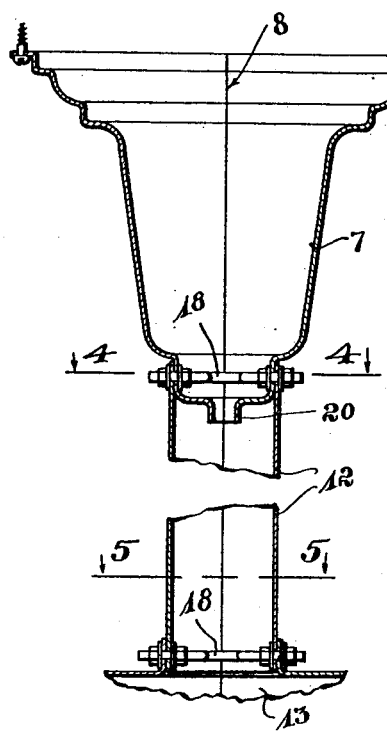
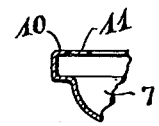
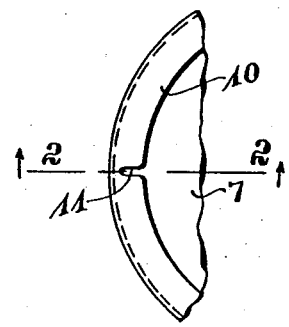
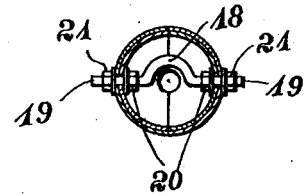
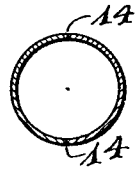
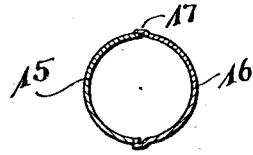
INVENTOR:
ALVIN A. BEIDELMAN,
By: *Otto H. Krueger.*
his Atty.

Patented Aug. 11, 1925.

1,549,432

UNITED STATES PATENT OFFICE.

ALVIN A. BEIDELMAN, OF LOS ANGELES, CALIFORNIA.

ELECTRIC-LIGHT FIXTURE.

Application filed August 27, 1923. Serial No. 659,621.

*To all whom it may concern:*

Be it known that I, ALVIN A. P. BEIDELMAN, a citizen of the United States, residing at Los Angeles, in the county of Los Angeles and State of California, have invented a new and useful Electric-Light Fixture, of which the following is a specification.

This invention relates to devices used to cover and connect the connections and lamp-socket to the ceiling.

One of the objects of this invention is to provide a canopy for chandeliers so designed that it can be placed around finished connections of lights.

Another object is to provide the casing or housing of electric light fixtures of a form to be easily removed and replaced around the connections between a lamp-socket and the wall or ceiling without requiring a disturbing of the finished connections or the connected lamp-socket.

Other objects will appear from the following description and appended claim as well as from the accompanying drawing, in which—

Fig. 1 is a fragmentary midsectional view of the main supporting parts of a chandelier embodying the invention.

Fig. 2 is a fragmentary midsectional view of a canopy of slightly modified form, illustrating the upper edge turned in, instead of being turned outwardly as illustrated in Fig. 1, in order to facilitate a connecting of such a canopy to a ceiling or wall by the necessary closing movement or action of a canopy of this type.

Fig. 3 is a top plan view of the modified form of canopy structure as illustrated in Fig. 2.

Fig. 4 is a cross section on line 4—4 of Fig. 1.

Fig. 5 is a cross section on line 5—5 of Fig. 1, illustrating two halves of the tubular portion of the device simply abutting one against the other.

Fig. 6 is a cross section similar to the one of Fig. 5, illustrating one of the halves provided with an overlapping edge in each of the joints to overlap the edges of the adjoining half.

For connecting the lights of a chandelier, it is the common practice to draw wires through the chandelier, securing one end of the chandelier to the wall or ceiling, and securing or even embodying the lamp or light-sockets to the other end of the chandelier. In case of repair or other required work on the wire connections, this arrangement necessitates a withdrawing of the wires from the chandelier, and frequently the disconnecting of the chandelier from the ceiling or wall, usually leaving the chandelier without support or as a ballast on the wires to be examined.

To make the wire connections easily accessible in practically their whole lengths, it is the principal point in view of this invention to make the canopy and other inclosing parts of such chandeliers removable.

In Fig. 1, the canopy 7 is made of individual parts clamped together, two parts being shown in this illustration, but it will easily be understood that the canopy may be made of more sections. Having decided on two sections, these may, of course, be in even halves or one larger and another smaller section. An abutting line is indicated at 8. The upper edge of the canopy 7 in Fig. 1 is turned outwardly to form a flange 9, by means of which the canopy may be secured to a ceiling, wall, or other similar supporting base.

A slightly modified form of attaching means for the upper edge of the canopy is illustrated in Figs. 2 and 3. Making the canopy in sections, to be drawn together, the closing movement in drawing the several sections of a canopy together can be used to attach the canopy to a supporting base. For this reason and purpose, the upper edge of the canopy is in this slightly modified form turned inwardly, to form the flange indicated at 10. This flange 10 is provided with a suitable number of cut-outs 11, so that, by drawing the several sections of the canopy together, the flanges 10 with the cut-outs 11 can be engaged with screws or other similar engaging means on a supporting base, so as to secure or attach the canopy to such a base, as a ceiling or wall.

The tubular member 12 in Fig. 1 is of common form, to connect the canopy 7 with the light-supporting termination of the chandelier.

A light-supporting termination of a chandelier is made of so many different forms that it is impossible to illustrate them all here, and such forms are not very material in this case, since most of such forms embody some kind of central portion, attachable to the tubular member of the chandelier, the base of such central portion being indicated at 13.

The tubular member 12, too, is preferably made in sections, in order to be applicable over the sides of the wire connections, in a similar manner as set forth above in regard to the canopy. The tubular member may also be made of halves or any other suitable number of sections, and of sections of any suitable form as long as the sections can be applied around the wire connections. In Fig. 5, the two halves of a tubular member are made of equal size and with even edges, to abut against each other as indicated at 14. In Fig. 6, the one half 15 is of simple semi-circular cross-section, while the half 16 is provided with overlapping edges 17, so that the half 16 can be engaged over the edges of the half 15.

The canopy is made to engage in a similar manner, and, of course, too, may be made to simply abut in the joints of the several sections, or may be made to overlap in a similar manner as illustrated in Fig. 6.

The individual sections are preferably connected by inserted bolts as illustrated in Figs. 1 and 4. The bolts 18 are threaded at both ends, as indicated at 19. The nuts 20 are set and adjusted on the bolts to abut against the inside of the sections, and the nuts 21 are tightened against the outside of the sections. Double nuts can, of course, be used on the inside, in order to allow a locking of the nut 20 in adjusted position. When once adjusted, the inner nuts 20 tend to support the sections in a desired form, round or otherwise, as will easily be understood without further illustration or description. As soon as the outer nuts 21 are removed, the sections can be removed from the chandelier so that the inclosed wires become easily accessible.

As illustrated, the bolts are preferably bent, so that inclosed wires may pass straight through the device.

The canopy 7 is provided with an extension-end 20, as illustrated in Fig. 1, by which the inclosed wires may be supported or suspended within the device.

Having thus described my invention, I claim:

In an electric light fixture, a chandelier embodying canopy and connecting members made in longitudinally divided sections having their adjoining edges following the directions of inclosed wires and adapted to be applied over the sides of the inclosed wires, and bolts disposed crosswise through the sections for maintaining the sections in a desired form having a bent portion disposed within the and following the inner contour of the structure to leave a central passage for wires.

In testimony that I claim the foregoing as my invention I have signed my name in the presence of two subscribing witnesses.

ALVIN A. BEIDELMAN.

Witnesses:
  O. H. KRUEGER,
  E. HATTENBACH.